United States Patent

Macknik et al.

[15] 3,678,279
[45] July 18, 1972

[54] AUTOMATIC VARIABLE GAIN OPTICAL TRACKER FOR SPACE VEHICLES COMPRISING D-C SYSTEM FOR ERROR SIGNAL GENERATION

[72] Inventors: Louis S. Macknik; Kenneth E. Kissell, both of Dayton, Ohio

[73] Assignee: The United States of America as represented by the Secretary of the Air Force

[22] Filed: June 2, 1970

[21] Appl. No.: 42,648

[52] U.S. Cl. ............................................. 250/203, 250/207
[51] Int. Cl. ..................................... G01j 1/20, H01j 39/12
[58] Field of Search ................... 356/172; 250/203, 207, 205

[56] References Cited

UNITED STATES PATENTS

| | | | |
|---|---|---|---|
| 2,921,757 | 1/1960 | Houle | 250/203 X |
| 3,478,219 | 11/1969 | Nutz | 250/203 X |
| 3,374,357 | 3/1968 | Barlow | 250/207 |

FOREIGN PATENTS OR APPLICATIONS

| | | | |
|---|---|---|---|
| 1,027,457 | 4/1966 | Great Britain | 250/203 |

*Primary Examiner*—Archie R. Borchelt
*Assistant Examiner*—T. N. Grigsby
*Attorney*—Harry A. Herbert, Jr. and James S. Shannon

[57] ABSTRACT

A tracker for optical targets that vary in brightness and size over a wide range and at a relatively high rate, such as may be presented, for example, by a tumbling body in space. A tracking telescope is provided with an optical device such as a pyramidal reflector or refractor having its apex at the focus of the telescope for splitting the target image into four beams 90 degrees apart. When the optical axis of the telescope is on the target the image is centered on the apex of the pyramid and the oppositely extending beams are equal. When there is a tracking error, the image is not centered on the apex and the differences in the light fluxes of the oppositely extending beams are directly related to the azimuthal and elevational components of the tracking error. These differences are converted into proportionate error signals for the elevation and azimuth servomechanisms of the telescope by means of four photomultipliers which convert the four beams into electrical signals, the differences in the outputs of associated pairs of photomultipliers constituting the error signals. In addition, the outputs of the four photomultipliers are added to produce an instantaneously acting automatic gain control voltage for the photomultipliers that is proportional to target brightness and independent of tracking error. The instantaneous adjustment of photomultiplier gain in inverse relation to target brightness holds the multiplier outputs within a narrow range over a wide range of target brightness variation, thereby permitting satisfactory tracking of such targets.

1 Claim, 5 Drawing Figures

AUTOMATIC VARIABLE GAIN OPTICAL TRACKER FOR SPACE VEHICLES COMPRISING D-C SYSTEM FOR ERROR SIGNAL GENERATION

BACKGROUND OF THE INVENTION

This invention is in the field of optical tracking devices for spacecraft. The light received on earth by reflection from a space vehicle is subject to a wide variation in intensity. Spacecraft in general, depending upon their design and configuration, provide optical images that cover a very wide brightness range. In addition, the light reflected from any particular spacecraft may vary over a wide range due to changes in attitude of the vehicle which may alter its reflectivity for various reasons including changes in apparent size. Where these changes occur rapidly, as in the case of a tumbling body, the image of the vehicle may vary in brightness and size over a wide range at a relatively high rate.

Conventional star-trackers as adapted to spacecraft applications are basically steady-state devices. While their sensitivity is adjustable to permit proper operation on targets of different brightness, such devices depend upon the selected target remaining at substantially the same brightness while the field around the target is scanned to establish the centering error. Their operation is unsatisfactory when the target brightness continually varies over a wide range at a rapid rate since if set to accommodate the lowest brightness level overloading of the tracking circuits occurs at the high brightness level, while a setting suitable for the high light levels provides insufficient sensitivity for operation of the tracking system at the low levels.

SUMMARY OF THE INVENTION

It is the purpose of this invention to provide an optical scanning system the operation of which is substantially independent of target brightness and fluctuations in target brightness over a wide brightness range.

Briefly, the tracking system in accordance with the invention utilizes a reflective or refractive pyramidal beam splitter to separate the optical image of the target formed by the telescope into four beams whose projections on the plane of the pyramid base are 90° apart. When the optical axis of the telescope passes through the target, the image is centered on the apex of the pyramid and the two beams in each pair of oppositely directed beams are equal. When there is a tracking error, the image is displaced from the apex causing the paired beams to differ in total light flux by amounts directly related to the azimuthal and elevational components of the tracking error. These two flux differences are converted into error signals for the azimuth and elevation servomechanisms of the telescope by means of four photomultipliers which convert the four beams into electrical signals from which the error signals are derived by taking the differences in the output signals of the photomultipliers which receive the paired beams. These error signals act through the azimuth and elevation servomechanisms of the telescope to reduce the error signals to zero.

In order for the tracking to be independent of target brightness over a wide range and also to be unaffected by target brightness variations, even those occurring at a relatively high rate, the outputs of all four photomultipliers are summed to produce a voltage proportional to the instantaneous target brightness. This voltage is applied as a gain control voltage to all four photomultipliers to provide an instantaneous control of photomultiplier sensitivity as an inverse function of target brightness. In this manner the output signals of the photomultipliers are held within a small range over a range of target brightness of at least 100,000 to 1. The error signals, and consequently the tracking response, are therefore substantially independent of variations in target brightness.

DETAILED DESCRIPTION

Figure 1:
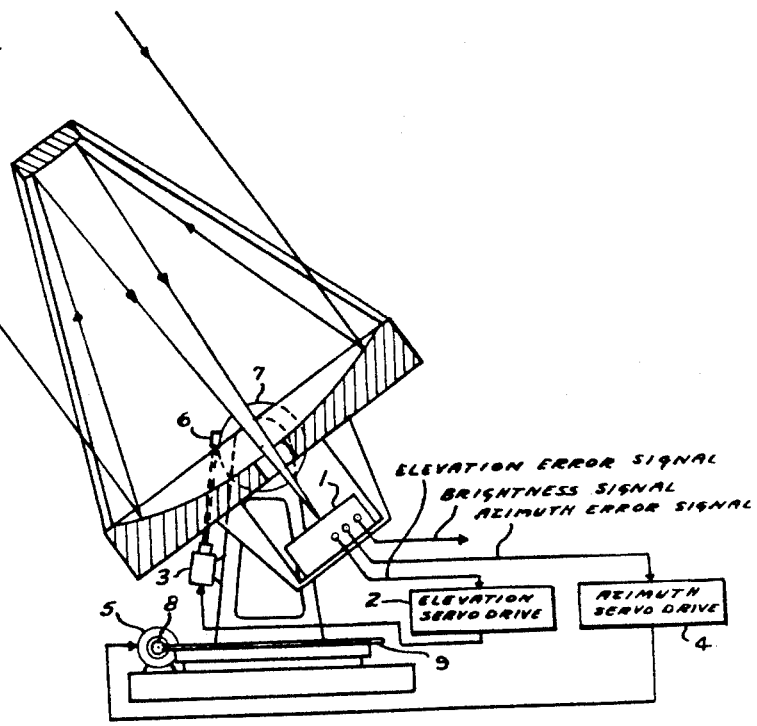
FIG. 1 is a simplified schematic illustration of a tracking telescope incorporating the invention.

Referring to the drawing, the basic elements of a complete optical tracking system incorporating the invention are shown in simplified schematic form in FIG. 1. These comprise essentially a tracking telescope of any suitable type, shown here as the reflecting type; an error signal generator represented by block 1 for receiving the optical image of the target formed at the focal plane of the telescope and for producing two error signals therefrom representing the elevational and azimuthal components of the tracking error; and servomechanisms, represented by elevation servo drive 2 and elevation servomotor 3, and by azimuth servo drive 4 and azimuth servo 5, which receive the elevation and azimuth error signals and act in response thereto to change the elevation and azimuth angles of the telescope in such directions as to reduce the error signals to zero. In this process, servo motor 3 acts through worm 6 and gear 7 to rotate the telescope about its horizontal elevation axis, and servomotor 5 similarly acts through worm 8 and gear 9 to rotate the telescope about its vertical azimuth axis.

Figure 2:
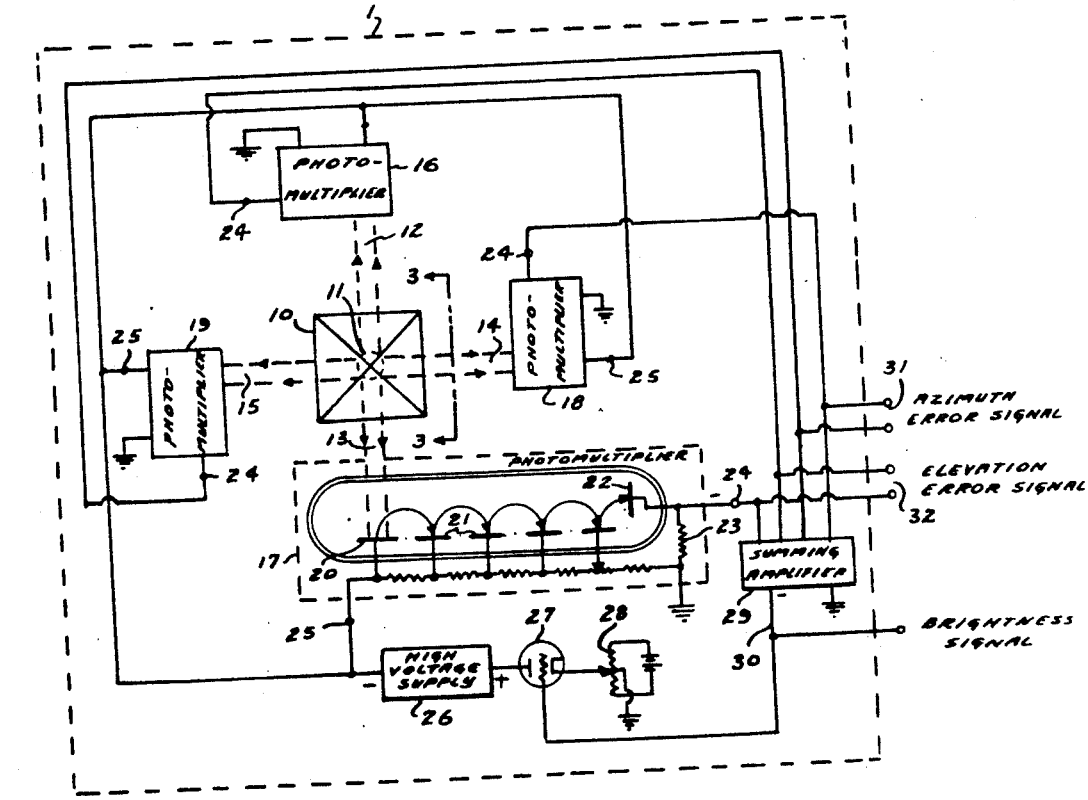
FIG. 2 is a schematic diagram of a tracking circuit constructed in accordance with the invention.

The invention is concerned primarily with the design of the error signal generator 1, the construction of which is shown schematically in FIG. 2. Referring to this figure, a pyramidal beam splitter 10 is positioned with its axis coincident with the optical axis of the telescope, with its apex at or near the focal plane of the telescope, and with one pair of opposite pyramidal faces normal to a vertical plane through the optical axis of the telescope.

Figure 3:
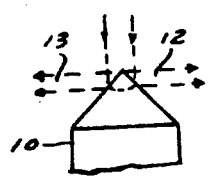
FIGS. 3 and 4 show alternative forms of pyramidal beam splitters that may be employed in FIG. 2.
Figure 4:
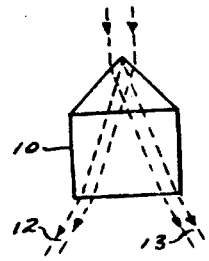

When the optical axis of the telescope passes through the target, i.e. when there is no tracking error, the target image is centered on the apex of the beam splitter, as represented by the circle 11 of FIG. 2. As a result the image light flux is divided into four equal beams 12, 13, 14 and 15. When there is a tracking error the image is not centered relative to the apex and the oppositely directed beams differ in total light flux by amounts directly related to the elevational and azimuthal components of the tracking error. For example, the difference in beams 12 and 13 may represent the elevational component of the error and the difference in beams 14 and 15 may represent the azimuthal component. The beam splitter 10 may employ reflection from the pyramidal faces, as in FIGS. 2 and 3, or refraction at these surfaces, as in FIG. 4. Other forms of beam splitters capable of performing the same function may also be used.

The beams 12, 13, 14, and 15 are converted into proportionate electrical signals by photomultipliers 16, 17, 18, and 19, respectively, the schematic illustration of photo-multiplier 17 serving for all. Referring to photomultiplier 17, the photons comprising beam 13 strike photocathode 20 liberating electrons which are increased in number by a factor, representing the gain of the device, through successive electron multiplication by secondary emission at dynodes 21. The final amplified electron current is collected by anode 22 and its flow through load resistor 23 produces an output signal voltage between output terminal 24 and ground which is proportional to the light flux in beam 13.

The gain of the photomultiplier, i.e. the ratio of the output voltage to the light flux, may be varied within limits by varying the direct operating voltage. This voltage is applied between terminal 25 and ground of each of the four photomultipliers and is derived from high voltage source 26 which has its negative terminal connected to the terminals 25 and its positive terminal connected through a variable resistance device 27 to ground. By varying the resistance of device 27 the operating potentials of the photomultipliers may be varied simultaneously for gain control purposes. Variable resistance 27 is shown as the anode circuit of a grid controlled vacuum tube, permitting the gains of the photomultipliers to be controlled by a gain control voltage applied to the grid. Potentiometer 28 provides a proper operating bias for the tube. Any other suitable voltage controlled resistance device may be substituted for tube 27. The outputs of the four photomultipliers, which are negative voltages relative to ground, are added in summing amplifier 29 to produce a negative voltage on line 30 proportional to the total light flux collected by the telescope and forming the image on the pyramidal beam splitter. This voltage is therefore proportional to target brightness and is substantially independent of tracking error. The application of this voltage to the grid of tube 27 causes the gain of the photomultipliers to vary instantaneously as an inverse function of target brightness. This holds the photomultiplier output voltages within narrow limits over a wide range of target brightness. In other words, the automatic gain control circuit provides the error signal generating circuit 1 with a logarithmic rather than a linear characteristic thus greatly increasing the dynamic range of the tracking system.

The azimuth and elevation error signals are derived by taking the differences of the output signals of the oppositely disposed photomultipliers. Thus, the azimuth error signal at terminals 31 is the difference between the output signal of photomultiplier 18 and the output signal of photomultiplier 19. It is a direct voltage the magnitude of which represents the magnitude of the azimuthal component of the tracking error and the polarity of which, determined by which of the photomultiplier outputs is the greater, indicates the direction of the error. Similarly, the error signal at terminals 32 is the difference in the outputs of photomultipliers 16 and 17 and represents the magnitude and direction of the elevational component of the tracking error.

The servomechanisms 2–3 and 4–5 used in FIG. 1 to control the telescope in elevation and azimuth in accordance with the error signals generated by circuit 1 and described above can be of any type suitable to the error signals.

Figure 5:
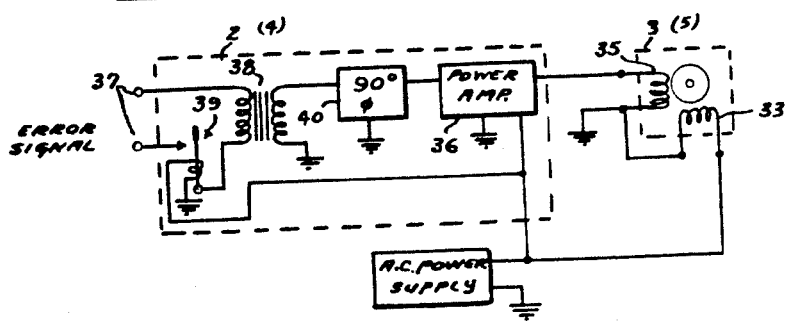
FIG. 5 shows a suitable servomechanism for use with error signals of the type generated by the circuit of FIG. 2.

An example is shown in FIG. 5. The servomotor 3 (or 5) is a two-phase induction motor having a fixed phase winding 33 receiving constant energization from AC power source 34 and a variable phase winding 35 receiving energization from power amplifier 36. The magnitude of the winding 35 energization is determined by the magnitude of the error signal and the phase of the energization is one of two 180° apart and 90° from the phase of winding 33 as determined by the polarity of the error signal. The DC error signal is applied to terminals 37 and thence to the primary of transformer 38 through a chopper 39 operating at the AC power supply frequency, thus producing at the secondary an AC voltage of power supply frequency which is either in phase with the power supply or in phase opposition thereto depending upon the polarity of the error signal. The secondary voltage, after a phase shift of 90 degrees in network 40, is used to drive power amplifier 36. The chopper 39, which may be of any suitable type, is shown as a resonant vibrating reed type driven in synchronism with the AC power supply voltage.

An example is shown in FIG. 5. The servomotor 3 (or 5) is a two-phase induction motor having a fixed phase winding 33 receiving constant energization from AC power source 34 and a variable phase winding 35 receiving energization from power amplifier 36. The magnitude of the winding 35 energization is determined by the magnitude of the error signal and the phase of the energization is one of two 180° apart and 90° from the phase of winding 33 as determined by the polarity of the error signal. The DC error signal is applied to terminals 37 and thence to the primary of transformer 38 through a chopper 39 operating at the AC power supply frequency, thus producing at the secondary an AC voltage of power supply frequency which is either in phase with the power supply or in phase opposition thereto depending upon the polarity of the error signal. The secondary voltage, after a phase shift of 90 degrees in network 40, is used to drive power amplifier 36. The chopper 39, which may be of any suitable type, is shown as a resonant vibrating reed type driven in synchronism with the AC power supply voltage.

By controlling the gain of photomultipliers in the above described manner, error signals of suitable magnitude for satisfactory tracking operation are assured over a wide range of target brightness and at a high rate of brightness fluctuation.

We claim:

1. An optical target tracking system comprising a tracking telescope having elevation and azimuth servomechanisms; a pyramidal beam splitter positioned on said telescope so that its axis coincides with the optical axis of the telescope, so that its apex is at the focal plane of the telescope, and so that one pair of opposite pyramidal faces are normal to a vertical plane through the optical axis of the telescope, whereby the light flux forming the target image at the apex of the beam splitter is divided into four light beams; four identical photomultipliers, each having a photocathode, a plurality of dynodes, and an anode and each having a potential divider with the photocathode connected to one end, the anode connected through an output impedance to the other end, and the dynodes connected to points intermediate the ends, each photomultiplier receiving one of said four light beams on its photocathode and producing an output voltage across its output impedance proportional to the light flux in the received beam; a source of direct current; means connecting the negative terminal of said source to the cathode ends of the four potential dividers; a voltage controlled variable resistance device having a resistance value directly related to the instantaneous value of the control voltage; means connecting the other ends of said potential dividers together and thence through said variable resistance device to the positive terminal of said source; means for adding the voltages across the output impedances of said photomultipliers together and for applying the resulting sum voltage as a control voltage to said variable resistance device for controlling the gains of said photomultipliers simultaneously as equal inverse functions of the instantaneous brightness of the target image formed as the apex of the beam splitter; means for deriving the difference in the voltages across the output impedances of the two photomultipliers receiving the beams produced by the pair of pyramidal faces of the beam splitter normal to said vertical plane and for applying said difference as an error signal to the elevation servomechanism; and means for deriving the difference in the voltages across the output impedances of the other two photomultipliers and for applying said difference as an error signal to said azimuth servomechanism.

* * * * *